US007401030B1

(12) United States Patent
Mather et al.

(10) Patent No.: US 7,401,030 B1
(45) Date of Patent: Jul. 15, 2008

(54) METHOD AND SYSTEM FOR TRACKING DISPOSITION STATUS OF AN ITEM TO BE DELIVERED WITHIN AN ORGANIZATION

(75) Inventors: Raymond G. Mather, Southbury, CT (US); Paul P. Carella, Southbury, CT (US); Shulong Sun, Orange, CT (US); Arthur L. Thursland, Sandy Hook, CT (US)

(73) Assignee: Pitney Bowes Inc., Stamford, CT (US)

( * ) Notice: Subject to any disclaimer, the term of this patent is extended or adjusted under 35 U.S.C. 154(b) by 754 days.

(21) Appl. No.: 09/475,364

(22) Filed: Dec. 30, 1999

(51) Int. Cl.
*G06Q 99/00* (2006.01)

(52) U.S. Cl. .................... 705/7; 705/1; 705/406
(58) Field of Classification Search .............. 705/7, 705/406, 1
See application file for complete search history.

(56) References Cited

U.S. PATENT DOCUMENTS

| | | | | |
|---|---|---|---|---|
| 4,832,204 | A | 5/1989 | Handy et al. | 209/3.3 |
| 5,038,283 | A | 8/1991 | Caveney | 364/403 |
| 5,117,096 | A | 5/1992 | Bauer et al. | 235/375 |
| 5,262,939 | A | 11/1993 | Vanpoucke | 364/401 |
| 5,313,052 | A | 5/1994 | Watanabe et al. | 235/375 |
| 5,485,369 | A | 1/1996 | Nicholls et al. | 364/401 |
| 5,631,827 | A | 5/1997 | Nicholls et al. | 705/28 |
| 5,635,694 | A | 6/1997 | Tuhro | 235/375 |
| 5,656,799 | A | 8/1997 | Ramsden et al. | 177/2 |
| 5,659,596 | A * | 8/1997 | Dunn | 455/456.1 |
| 5,671,374 | A * | 9/1997 | Postman et al. | 710/305 |
| 5,696,965 | A * | 12/1997 | Dedrick | 707/10 |
| 5,712,789 | A | 1/1998 | Radican | 364/478.14 |
| 5,732,401 | A * | 3/1998 | Conway | 705/29 |
| 5,770,841 | A | 6/1998 | Moed et al. | 235/375 |
| 5,778,348 | A | 7/1998 | Manduley et al. | 705/409 |
| 5,781,889 | A * | 7/1998 | Martin et al. | 705/1 |
| 5,787,400 | A | 7/1998 | Weber | 705/1 |
| 5,831,220 | A | 11/1998 | Ramsden et al. | 177/1 |
| 5,852,809 | A | 12/1998 | Abel et al. | 705/26 |

(Continued)

FOREIGN PATENT DOCUMENTS

EP 0 565 290 A2 * 10/1993

(Continued)

OTHER PUBLICATIONS

Texas Instruments Enters Telecommunicationd Field With Silent 700 (TM) Series, News Release, May 19, 1987, p. 1.*

*Primary Examiner*—Akiba K Robinson Boyce
(74) *Attorney, Agent, or Firm*—Brian A. Lemm; Angelo N. Chaclas

(57) ABSTRACT

A method and system for tracking the receipt and the internal movement of items such as packages, parcels and other accountable items within an organization such as a corporation, hospital or school. The system comprises a portable data terminal programmed to record information regarding the receipt and the internal movement of the items in a data collection format, wherein the data collection format can be created and/or modified by the user according to the user's needs. For that purpose, the system further comprises a base station to allow the user to create and/or modify the data collection format. The base station is capable of communicating with the portable data terminal for unloading electronic files to the portable data terminal in order to modify the data collection format.

11 Claims, 19 Drawing Sheets

U.S. PATENT DOCUMENTS

| | | | |
|---|---|---|---|
| 5,869,819 A | 2/1999 | Knowles et al. | 235/375 |
| 5,880,451 A | 3/1999 | Smith et al. | 235/452.1 |
| 5,910,896 A | 6/1999 | Hahn-Carlson | 364/479.01 |
| 5,913,210 A | 6/1999 | Call | 707/4 |
| 5,995,015 A * | 11/1999 | DeTemple et al. | 340/825.49 |
| 6,035,291 A | 3/2000 | Thiel | 705/408 |
| 6,105,014 A * | 8/2000 | Ramsden et al. | 705/410 |
| 6,134,561 A * | 10/2000 | Brandien et al. | 707/104 |
| 6,182,053 B1 * | 1/2001 | Rauber et al. | 705/28 |
| 6,219,653 B1 | 4/2001 | O'Neil et al. | 705/400 |
| 6,279,037 B1 * | 8/2001 | Tams et al. | 709/224 |
| 6,289,323 B1 | 9/2001 | Gordon et al. | 705/40 |
| 6,321,092 B1 * | 11/2001 | Fitch et al. | 455/456 |
| 6,321,992 B1 | 11/2001 | Knowles et al. | 235/478.01 |
| 6,323,782 B1 | 11/2001 | Stephens | 340/825.31 |
| 6,519,568 B1 * | 2/2003 | Harvey et al. | 705/1 |

FOREIGN PATENT DOCUMENTS

EP   0 787 334 B1 *   8/1998

* cited by examiner

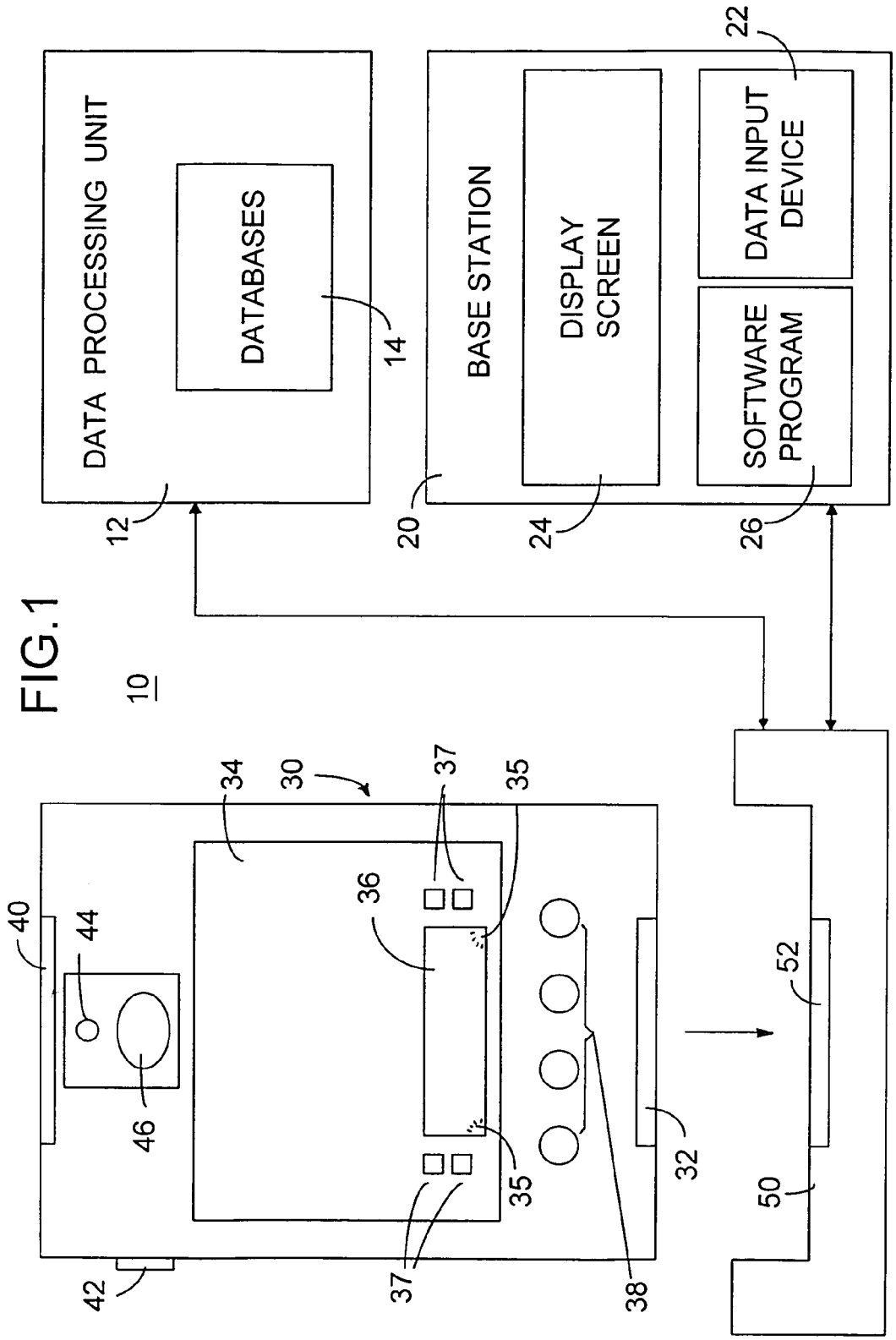

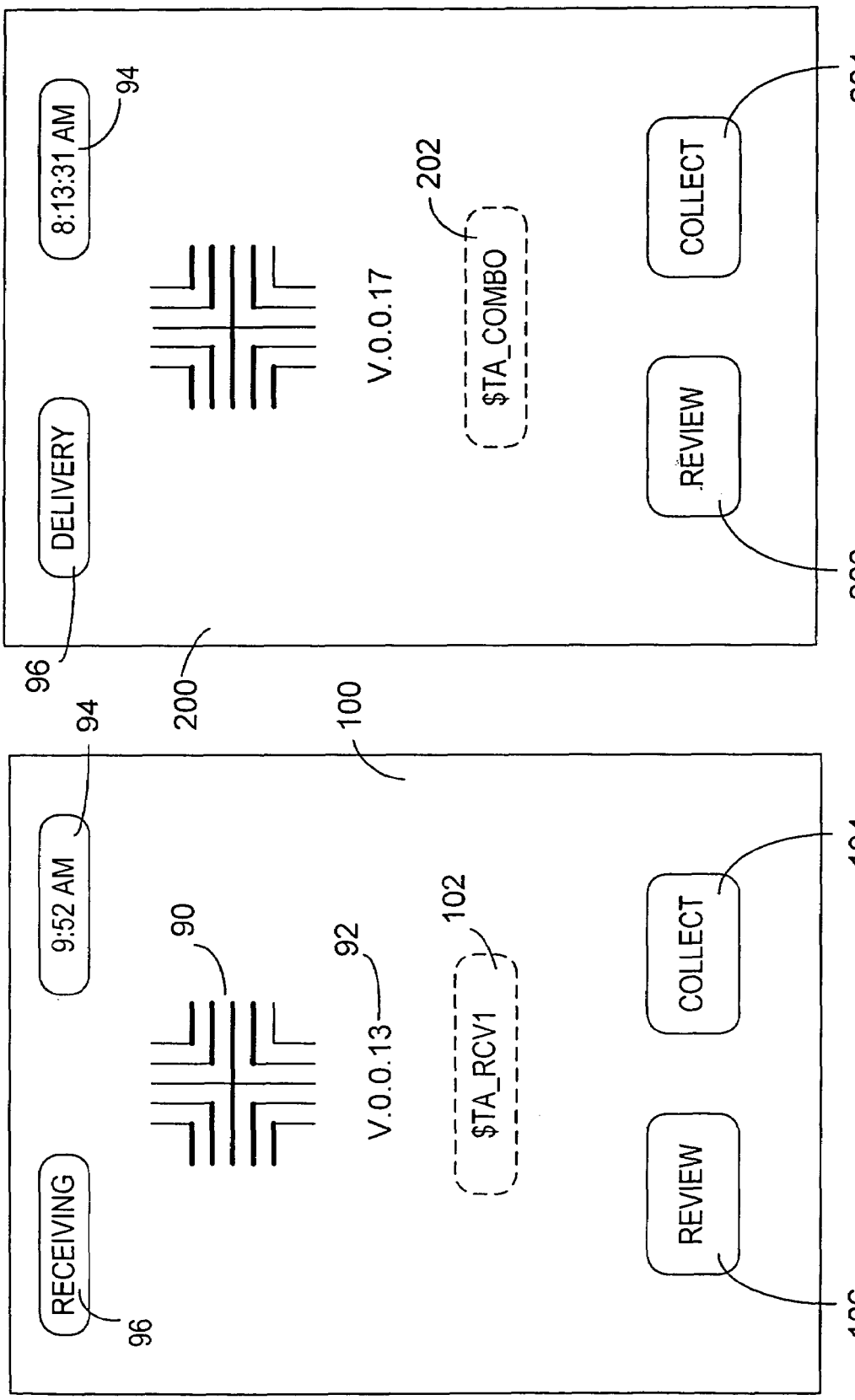

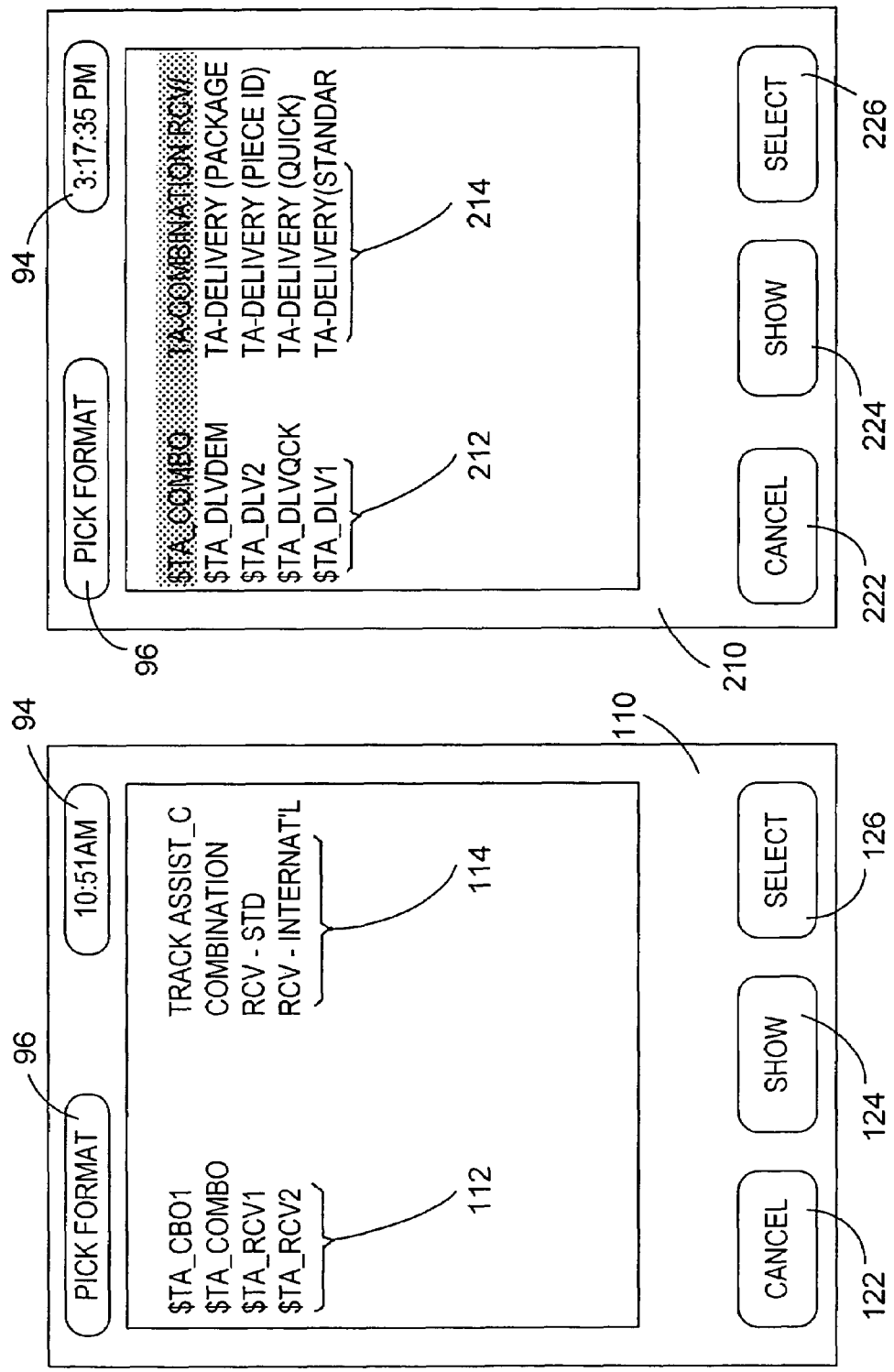

| RCV2 | RCV1 | RCV3 | RCVPO | RCVQCK |
|---|---|---|---|---|
| CARRIER | CARRIER | CARRIER | CARRIER BARCODE | CARRIER |
| EMPLOYEE NAME | SENDER NAME | CARRIER BARCODE | CARRIER | CARRIER BARCODE |
| CARRIER BARCODE | EMPLOYEE NAME | EMPLOYEE NAME | SENDER NAME | |
| | CARRIER BARCODE | | PO NUMBER | |
| | | | EMPLOYEE NAME | |
| | | | REF. NOTES | |

FIG. 3B

| COMBO | DVLDEM | DVL2 | DLVQCK | DVL1 |
|---|---|---|---|---|
| CARRIER BARCODE | CARRIER BARCODE | PACKAGE ID | TRACKING NUMBER | EMPLOYEE NAME |
| CARRIER | EMPLOYEE NAME | DELIVERED TO | DELIVERED TO: | CARRIER BARCODE |
| EMPLOYEE NAME | SENDER NAME | | | DELIVERED TO: |
| PO NUMBER | | | | |

FIG. 11B

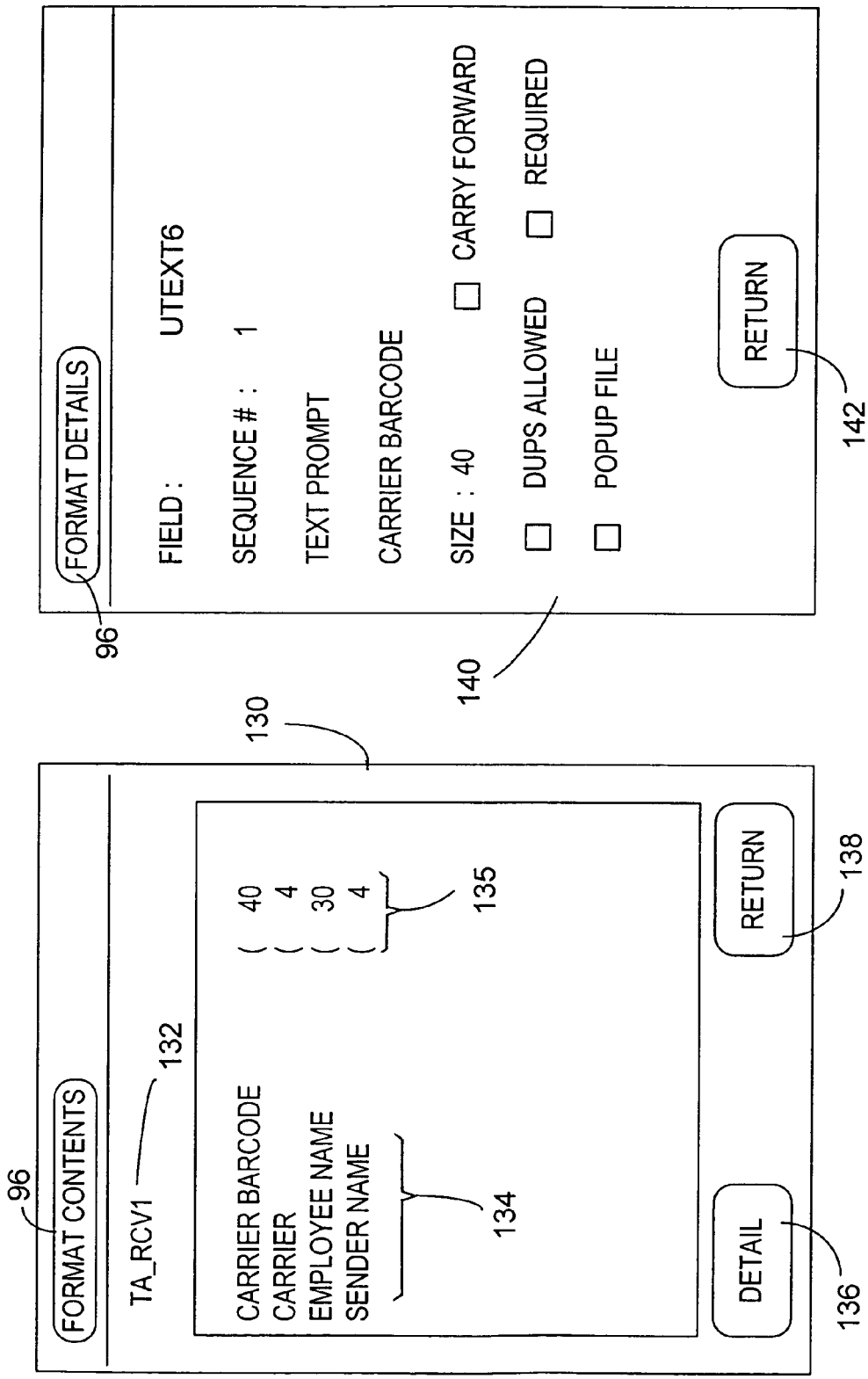

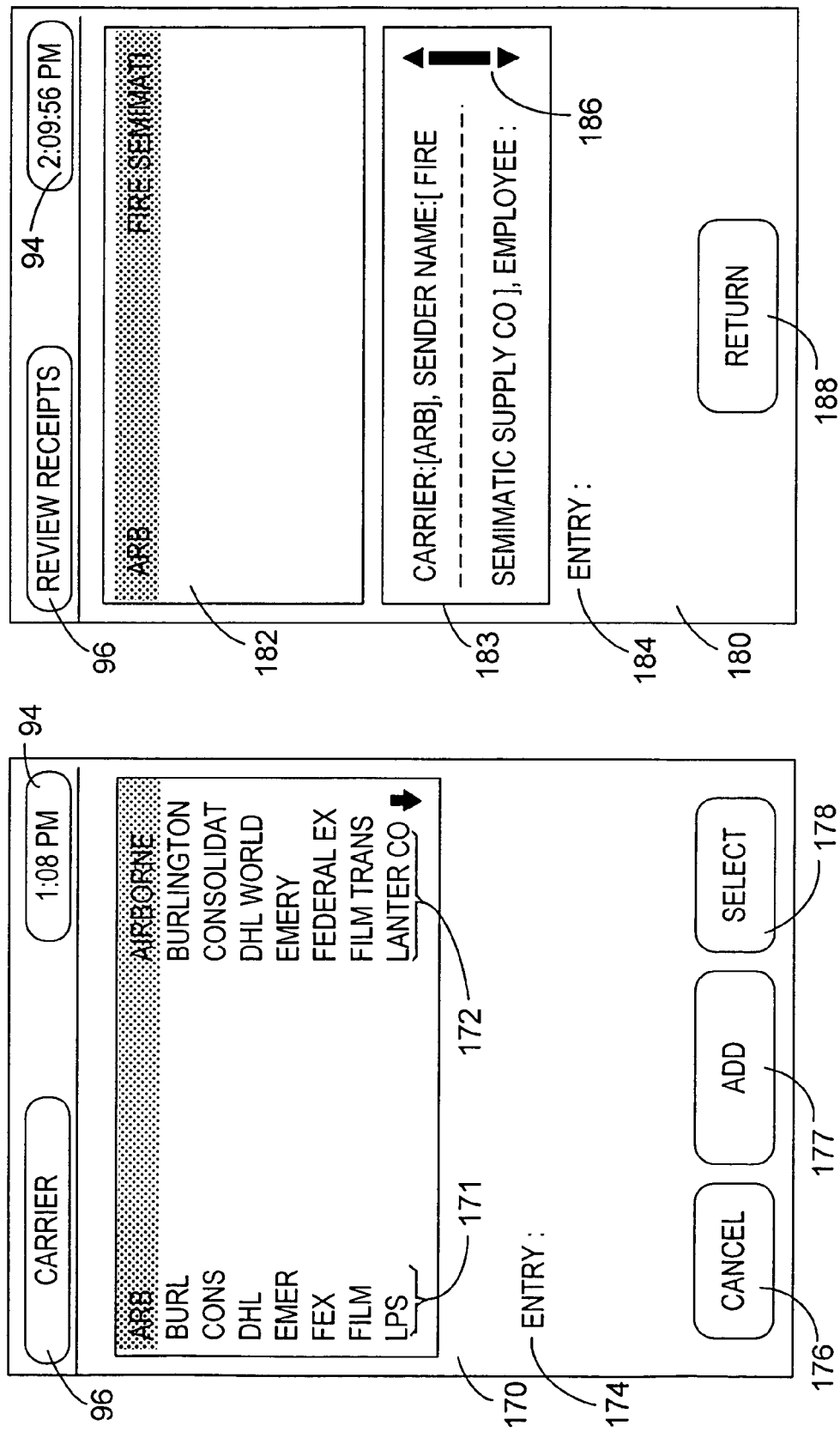

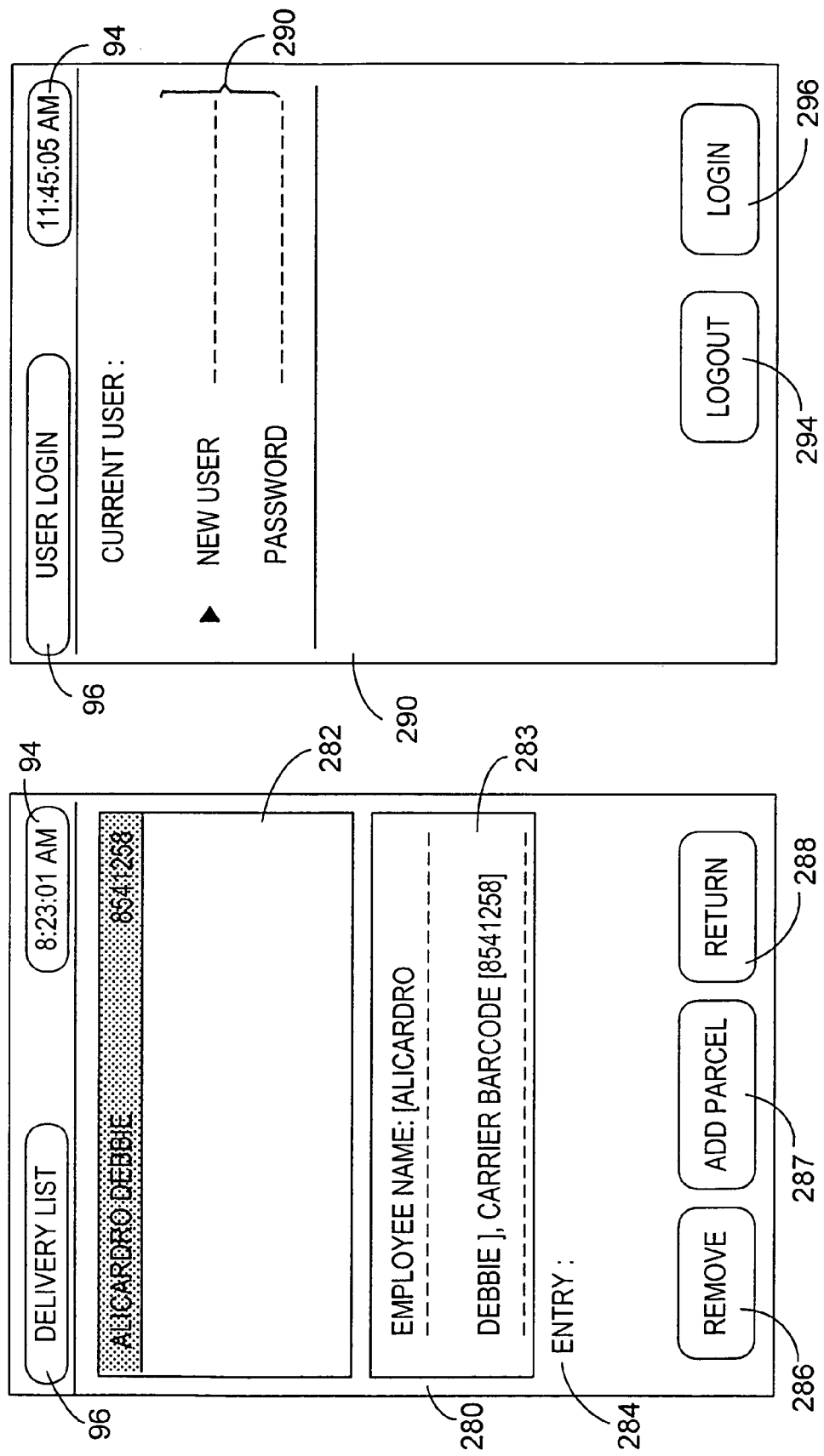

METHOD AND SYSTEM FOR TRACKING DISPOSITION STATUS OF AN ITEM TO BE DELIVERED WITHIN AN ORGANIZATION

CROSS-REFERENCE TO RELATED APPLICATION

Reference is made to application Ser. No. 08/998,560, entitled "SYSTEM FOR TRACKING THE RECEIPT AND INTERNAL DELIVERY OF ITEMS SUCH AS PACKAGES" by Clint F. Brandien et al, assigned to the assignee of this application and filed on Dec. 29, 1997.

TECHNICAL FIELD

The present invention relates generally to the receipt of accountable items such as packages by an establishment or organization such as a hospital, hotel, corporation, school or the like and the delivery of the received items to intended recipients within the organization and, more specifically, to the method and system for tracking the receipt and internal movement resulting in the final disposition of the items.

BACKGROUND OF THE INVENTION

Businesses and other large organizations typically have a mailroom or delivery department which serves as a central point for the receipt of items such as mail pieces, parcels, and packages. The received items must then be delivered to the intended recipients within the organization. For large organizations, which may have hundreds or even thousands of employees, the internal delivery is a complex issue. In a large organization, not only the received item must be delivered as soon as possible, but the internal delivery or other disposition status of the items must also be recorded and updated so that the whereabouts of the received items can be known instantly, if desired. The tracking of the receipt and the internal disposition of the items is useful for the management to evaluate the performance of the delivery department. Moreover, the tracking of the delivery status can eliminate the unnecessary frustration and wrongful accusation toward the person responsible for the internal delivery when an item is misplaced or lost after delivery.

Systems have been developed to track the receipt and internal delivery of items within large organization. One such known system is marketed by the assignee of the subject invention under the trade name of ARRIVAL.

ARRIVAL is a software system which typically runs on a microcomputer to maintain a database of items received by a large organization. Typically, the record of a received item includes information such as a tracking number provided by the carrier who delivered the item to the organization, the date and time received, the name of the carrier, the name of the employee who actually received the item from the carrier, the name of the intended recipient, date and time of the internally delivery of the received item and name of the person who signs for the internally delivered item. Typically, the tracking number is provided by the carrier in a barcode form so that it can be read with an optical scanner known as a barcode reader.

Preferably, the above-mentioned tracking data collection system includes a data processing unit which is programmed to maintain a database of records relating to received items, each of the records identifying an internal delivery address and delivery status for one of the received items, and to generate a manifest which identifies selected received items for internal delivery. The system also includes a portable data terminal which has the capability to communicate with the data processing system and which is programmed to input internal delivery information for the selected received items, and to communicate the internal delivery information to the data processing system.

The portable data terminal has been disclosed in the patent application as identified in the cross-reference.

While the portable data terminal and the data processing system have proven to be successful for the intended purposes, there are areas in which improvements can still be made.

It has been recognized that each organization has its own preferred format for recording data relating to the receipt and internal delivery of an item. Accordingly, it is an object of the subject invention to provide a portable data terminal for tracking the receipt and the internal delivery status of items such as packages, wherein the data collection format for recording the tracking information can be created and/or modified by the user of the portable data terminal, in accordance with the user's needs.

SUMMARY OF THE INVENTION

The first aspect of the present invention is to provide a portable data terminal for tracking the receipt of an item such as a package, and the status of internal movement resulting in delivery or other final deposition of the received item within an organization, wherein the item is received from a carrier and is to be delivered to an intended recipient within the organization and wherein the item has an identification symbol such as a barcode or a tracking number to identify the item. The portable data terminal includes an optical device for reading the identification symbol, a data entry device for data entry, and a display screen for displaying information, wherein the information includes receipt information displayed in a receiving data collection format and internal movement information displayed in a delivery data collection format. The portable data terminal is programmed such that the data collection formats can be created and/or modified by a user according to the user's needs.

Preferably, the portable data terminal is capable of communicating with a base station in order to download electronic files for upgrading the data collection formats.

Both the receiving data collection format and the delivery data format include a plurality of entry listing types and each entry listing type includes a plurality of entry items such as the carrier name, the carrier barcode, the employee name, the sender name, and the PO number, wherein these entry items are selectable at the base station by the user so that the selected entry items can be included in a certain entry listing type in order to create a new data collection format or modify an existing data collection format.

The second aspect of the present invention is to provide a system for tracking the receipt of an item such as a package, and the status of internal movement resulting in delivery or other final deposition of the received item within an organization, wherein the item is received from a carrier and is to be delivered to an intended recipient within the organization. The system includes: a) a portable data terminal programmed to record information regarding the receipt and the internal movement of the item, wherein the receipt information and the internal movement information are recorded in a data collection format; and b) a base station capable of communicating with the portable data terminal for uploading electronic files to the portable data terminal in order to modify the data collection format. It should be noted that the term "carrier" herein is used in the broadest sense in that the carrier can be a courier, a sender or any person who delivers the item to the organization.

Preferably, the base station communicates with the portable data terminal via a connection cradle. It is possible that the base station communicates with the portable data terminal through electrical cables, optical links, infrared signals, radio signals or any wireless means. It is also possible that the base station serves as a docking station for the portable data terminal so as to allow the portable data terminal to communicate with the base station through a connection port.

Preferably, the system further includes a data processing unit capable of communicating with the portable data terminal, wherein the data processing unit maintains a database of records so as to allow the data processing unit to retrieve the information recorded in the portable data terminal and store the retrieved information in the database. Preferably, the database of records includes records of received items, records identifying the address of the intended recipient and the internal delivery status for a corresponding one of the received items; records of recipient names. The data processing unit is also programmed to generate a manifest of selected received items; and generate a list of selected recipient names.

The third aspect of the present invention is to provide a method for tracking the receipt of an item such as a package, and the status of internal movement resulting in delivery or other final disposition of the received item within an organization, wherein the item is received from a carrier and is to be delivered to an intended recipient within the organization. The method includes the steps of a) recording information regarding the receipt of the item; and b) recording information regarding the internal movement of the item, wherein the receipt information and the delivery movement information are recorded with a data collection format which is upgradable in order to allow the user to modify the data format according to the user's needs.

Preferably, the data format includes a plurality of entry listing types, and each listing type includes a different combination of entry items such as the carrier name, the carrier barcode, the employee name, the sender name, the PO number and the actual recipient. The method further includes the step of adding or deleting the entry items in order to create or modify an entry listing type so as to modify the data collection format.

Preferably, the method further includes the step of storing the recorded information in a database.

The subject invention will become apparent upon reading the description taken in conjunction with FIGS. 1-24.

BRIEF DESCRIPTION OF THE DRAWINGS

FIG. 1 is a schematic representation showing the different components of the receipt and delivery tracking system, according to the present invention.

FIG. 2 is a schematic representation of a display screen showing an exemplary Receiving Menu of the portable data terminal, according to the present invention.

FIG. 3A is a schematic representation of a display screen showing a plurality of listing types for the Receiving data collection formats.

FIG. 3B shows the different combination of the data entry fields under each listing type of the Receiving data collection formats.

FIG. 4 is a schematic representation of a display screen showing an exemplary Format Contents screen which lists the data entry fields of a selected listing type for Receiving.

FIG. 5 is a schematic representation of a display screen showing an exemplary Format Details screen which provides the detailed information regarding the Format Contents of FIG. 4.

FIG. 7 is a schematic representation of a display screen showing an exemplary popup list of carriers.

FIG. 8 is a schematic representation of a display screen showing an exemplary Review Receipts screen which gives a summary of recorded information regarding a received item that the user has processed or entered.

FIG. 10 is a schematic representation of a display screen showing an exemplary Delivery Menu of the portable data terminal.

FIG. 11A is a schematic representation of a display screen showing a plurality of listing types for the Delivery data collection formats.

FIG. 11B shows a different combination of the data entry fields under each listing type of the Delivery data collection formats.

FIG. 14 is a schematic representation of a display screen showing an exemplary Delivery List screen which allows the user to review all deliveries recorded.

FIG. 15 is a schematic representation of a display screen showing an exemplary User Login screen which allows a user to login and logout the portable data terminal.

DETAILED DESCRIPTION

Figure 6B:
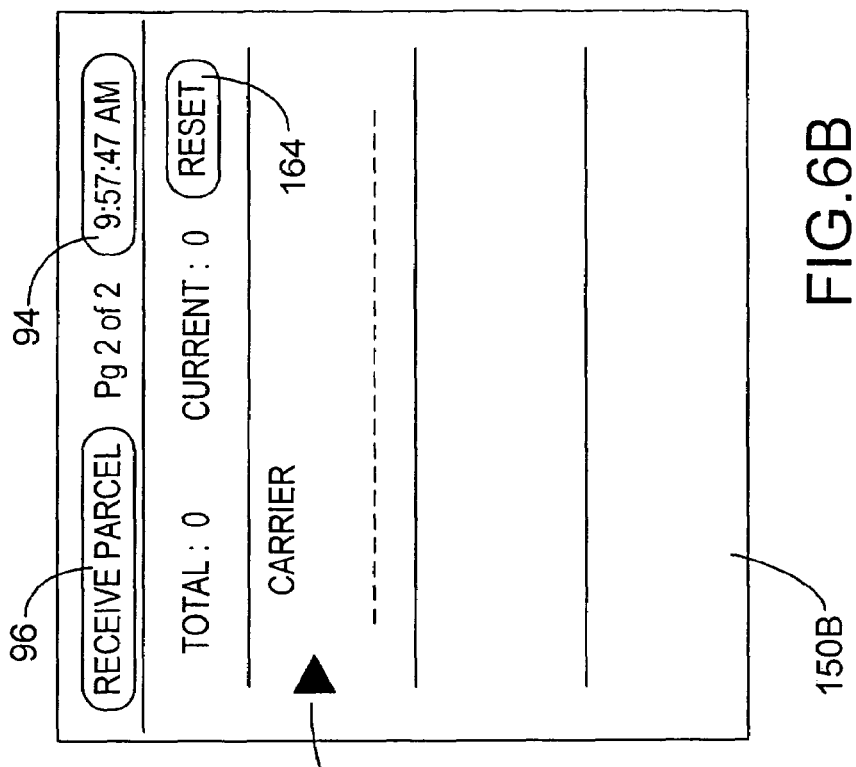
FIGS. 6A and 6B are schematic representations of a display screen showing an exemplary Receiving Parcel screen which allows a user to enter information regarding the receipt of an item.

As shown in FIG. 1, the tracking system 10 comprises a data processing unit 12, a base station 20, a portable data terminal 30 and a connection cradle 50. The data processing unit 12 maintains a plurality of databases 14, which may include a database of records relating to received items and identifying an internal delivery address and internal delivery status for each received item; a database of names and internal addresses of recipients or employees, a database of carriers; a database of senders; and a database of received items. The received items may include packages, parcels, mail pieces and other accountable items. The data processing unit 12 can also be used to print a manifest of selected received items if so desired. It should be noted that the databases 14 as described herein are only examples.

The portable data terminal 30 is programmed to record the receipt of items, record and validate the status information regarding the internal movement of the received items, and associate the received items with the recipients, the senders and other related descriptive data elements using barcode scanning, popup, keyboard entry, or look-up tables. The elements of data that can be recorded are configurable using a plurality of different data collection formats. The portable data terminal 30 is also programmed to acquire a signature for one item or a group of items being delivered. Furthermore, the portable data terminal 30 can be programmed to receive a manifest from the data processing unit 12 and communicate the internal delivery status information to the data processing unit 12. As shown, the portable data terminal 30 has a communication device 32 so as to allow the portable data terminal 30 to send or receive communication signals to or from an external device, such as the data processing unit 12. The portable data terminal 30 further includes a display screen 34 for displaying information, a hand-entry area 36 for receiving hand-written data. The data terminal 30 has a plurality of menu icons 37 and application buttons 38 to allow a user to select different programs and options. For example, the user can select a Receiving program to record or review information regarding the receipt of an item, or a Delivery program to record or review information regarding the delivery of a received item. The user can manually input data into the portable data terminal 30 by using an on-screen keyboard (not shown) by tapping the target areas 35. Preferably, the portable data terminal 30 is equipped with a laser barcode scanner 40 which can be turned on by pressing the trigger button 42. A scan button 46 is used to start the scanning of a barcode. A laser decode LED 44 is used to indicate that the scanner is on and the scanning of the barcode is completed. In order to transfer the information recorded by the portable data terminal 30 to an external device, a connection cradle 50 is provided. On the connection cradle 50, another communication device 52 is provided to receive the communication device 32 of the portable data terminal 30. For example, once the portable data terminal 30 is mounted on the connection cradle 50, the connection cradle 50 enables communications between the portable data terminal 30 and the data processing unit 12. The connection cradle 50 also enables communication between the portable data terminal 30 and the base station 20. It should be noted that the portable data terminal 30 can also communicate with the data processing unit 12 and the base station 20 through electrical cables, optical links, infrared signals, radio signals or other wireless means.

The portable data terminal 30 is programmed to record information in a certain data collection format. The base station 20 is mainly used to create a new data collection format or modify an existing data collection format according to the user's needs. The base station 20 sends an electronic file via the connection cradle 50 to the portable data terminal 30 in order to modify the data collection format. For purposes of modifying data collection format in the portable data terminal 30, the base station 20 includes a data input device 22 and a display screen 24 to allow the user to change the data collection format in accordance with the needs of the users.

The base station 20 can be a Windows-based personal computer or any suitable data processing device. Preferably, the portable data terminal 30 is a hand-held data processing device using the PALM O/S, which is the operating system for a PALM PILOT, or other similar device. The base station 20 further includes a software program 26 compatible to the operating system of the portable data terminal 30 to enable communication between the portable data terminal 30 and the base station 20.

After the portable data terminal 30 is turned on, it is possible for the user to select a desired function or program from the menu icons 37 or the application buttons 38. In particular, the user can select the Receiving program or the Delivery program. It is also possible that the user selects a Manifest program in order to produce a manifest regarding the receipt and/or final disposition of an item.

The Receiving program captures information regarding the receipt of items. The program allows the user to collect and review data. The Receiving program also allows the user to delete records. Preferably, the data collection function operates in a continuous cycle, prompting for data to be placed into appropriate fields as defined by a specific Receiving script, until the user selects another application or program.

The Delivery program is used to record information regarding the internal movement resulting in the delivery or other final disposition status of the received items. This information can be exported to the data processing system 12 for proof of delivery, auditing, reporting and tracking. After an item or a group of items are delivered, it is preferred that the program prompts for delivery/group delivery information including a signature. After saving the delivery/group delivery data, the program begins the data collection loop again.

Figure 6A:
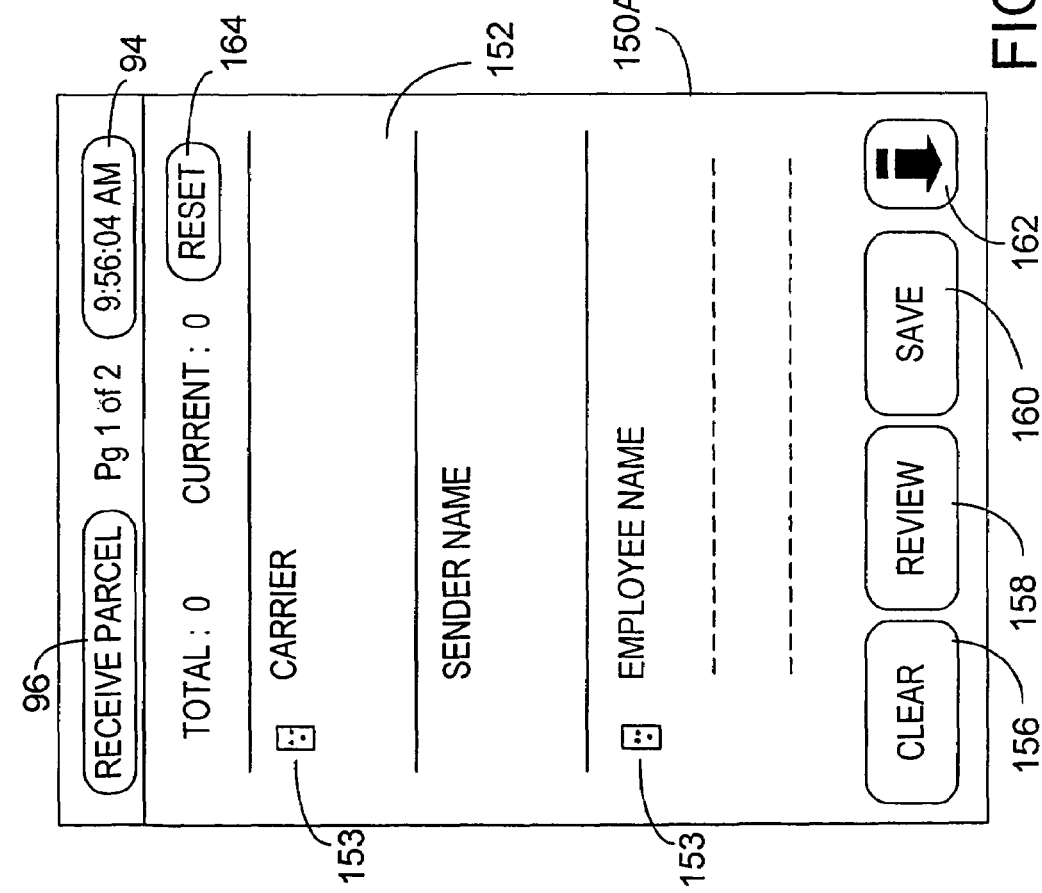

FIG. 2 shows an exemplary Receiving screen when the Receiving program is selected from the portable data terminal 30. As shown, the Receiving screen 100 shows a company logo 90, a product version number 92, a screen title 96, and the time of day 94. Also shown on the screen 100 is a box 102 containing the name of a receiving data collection format. If the user wants to use the displayed data collection format 102 to collect receiving data, the user can press the Collect button 104 to reach a receiving data collection screen as shown in FIGS. 6A and 6B. If the user wants to use another data collection format to collect receiving data, the user can click on the box 102 to reach a Pick Format screen for Receiving, as shown in FIG. 3A. However, if the user wishes to see a summary of information regarding a received or entered item, the user should select the Review option 106 to reach the Review Receipt screen as shown in FIG. 8.

FIG. 3A shows an exemplary listing of receiving data collection formats on the Pick Format screen 110. As shown, there are four different receiving data collection formats, collectively denoted by reference numeral 112, along with the descriptions 114 of the formats. If the user wants to return the Receiving screen (FIG. 2), the Cancel button 122 should be pressed. If the user wants to select any one of the listed formats, the user can highlight the desired format by pressing the corresponding screen area and then press the Select button 126. The Show button 124 is used to reach a Format Contents screen as shown in FIG. 4. As shown in FIG. 3A, one of the listed formats is a combination data collection format for both receiving and delivery, the $TA_COMBO format.

FIG. 3B shows the format contents of different Receiving data collection formats. As shown, each data collection format is a different combination of data entry fields including: the name of the carrier, the name of the intended recipient (employee), the carrier barcode, the name of the sender, the PO number or Mail Stop number of the internal delivery address, and reference notes. The user can select one of the receiving data collection formats for recording the receipt of an item.

However, if the user wants to modify the existing collection formats or create one or more new collection formats, he or she can do so on the base station 20, as described in conjunction with FIGS. 16 to 24. The modified or newly created collection formats can then be transferred from the base station 20 to the portable data terminal 20 via the connection cradle 50.

FIG. 4 shows a Format Contents screen for a receiving collection format called $TA_RCV1. As shown, the title of the data collection format is denoted by numeral 132. The list 134 of data entry items contains both entry items as shown in FIG. 3B. The numerical FIG. 135 following each data entry item 134 is the number of positions on the data collection screen associated with the specific field element described in data entry item 134. For example, the Carrier barcode field can be entered up to forty characters, while the Sender Name field can have four characters. These items are received from four different carriers, delivered to thirty recipients in eight different departments within the organization. The user may return to the previous screen by pressing the Return button 138 or reach a Format Details screen by pressing the Detail button 136.

FIG. 5 shows the Format Details screen 140. The Format Details screen displays the data collection attributes of each of the fields shown on the screen. The attributes include:

Field—Name of the field within the data collection system that will be populated with the collected data;

Sequence—The location on the data collection screen where this field will appear in relation to the other fields in the format;

Text Prompt—The user defined value which will be displayed when collecting data for this field;

Size—Number of characters allowed in the field;

Carry Forward—An indicator that the value of this field should be carried forwarded, and automatically displayed as the value to save for the next record collected;

Dups Allowed—when this box is checked, duplicate checking will not be employed for values entered into this field;

Required—When this box is checked, any entry must be supplied for this field on every record; and Popup File—When this box is checked, this field displays a lookup table or popup list during data entry and the name of the lookup table or popup list is identified.

When the displaying screen 30 of the portable data terminal 30 shows a Receiving screen 100 as shown in FIG. 2, the user may press the Collect button 104 to reach the Receive Parcel screen. As shown in FIGS. 6A and 6B, the Receive Parcel screen 150 is split into two halves because of the limited space of the display area. The Receive Parcel screen 150 as shown in FIGS. 6A and 6B lists four data entry fields of the Receiving data collection format called $TA_RCV1 as shown in FIG. 3B. The data entry fields 152 include the carrier name, the sender name, the recipient name and the carrier barcode. The fields 152 can be selected by pressing the appropriate screen area. The currently selected field for data entry is shown with a mark 154. After a field is selected, data can be entered using the on-screen keyboard (not shown). If the selected field is the carrier barcode, the laser scanner 40 of the portable data terminal 30 (FIG. 1) can be used for data entry. If the carrier name is also contained in the barcode, then data in that field can also be entered using the scanner 40.

If a paper icon 153 appears next to a field, a popup list is available for that field. It that is the case, data can be entered by using the on-screen keyboard or by selecting an item from the popup list. As shown, the paper icon 153 appears next to the carrier field and the employee name field. Thus, a popup list of carriers and a popup list of recipients can be accessed in order to select the carrier and the recipient from the respective lists. An example of the carrier popup list is shown in FIG. 7.

In FIG. 6A, the first half 150*a* of the Receive Parcel screen also shows three buttons in the lower portion of the screen: Clear button 156, Review button 158, Save button 160 along with a page-down arrow 162. The Clear button 156 is used to clear information from a selected field. The Review button 158 has the same function as the Review button 106 shown in FIG. 2. The Save button 160 is used to save the information entered to a selected field. The page-down arrow 162 is used to access the second half 150*b* of the Receive Parcel screen as shown in FIG. 6B.

As shown in FIG. 6B, the screen 150*b* displays the fourth of the data entry fields, which is the carrier barcode field. In both screens 150*a* and 150*b*, a Reset button 164 is provided to allow the user to restart the entry of information.

A Carrier screen 170 is shown in FIG. 7. The screen 170 contains a popup list which includes a plurality of alphabetical symbols 171 along with the names 172 of the carriers. The screen 170 also has an Entry field 174 which allows the user to input a value to search for a particular carrier if the name of the carrier is not shown on the screen. The Cancel button 174 is used to return to the previous screen 150*a*. The Select button 180 is used to select the carrier name to be entered onto the Carrier field on the Receive Parcel screen 150*a*.

Figure 9:
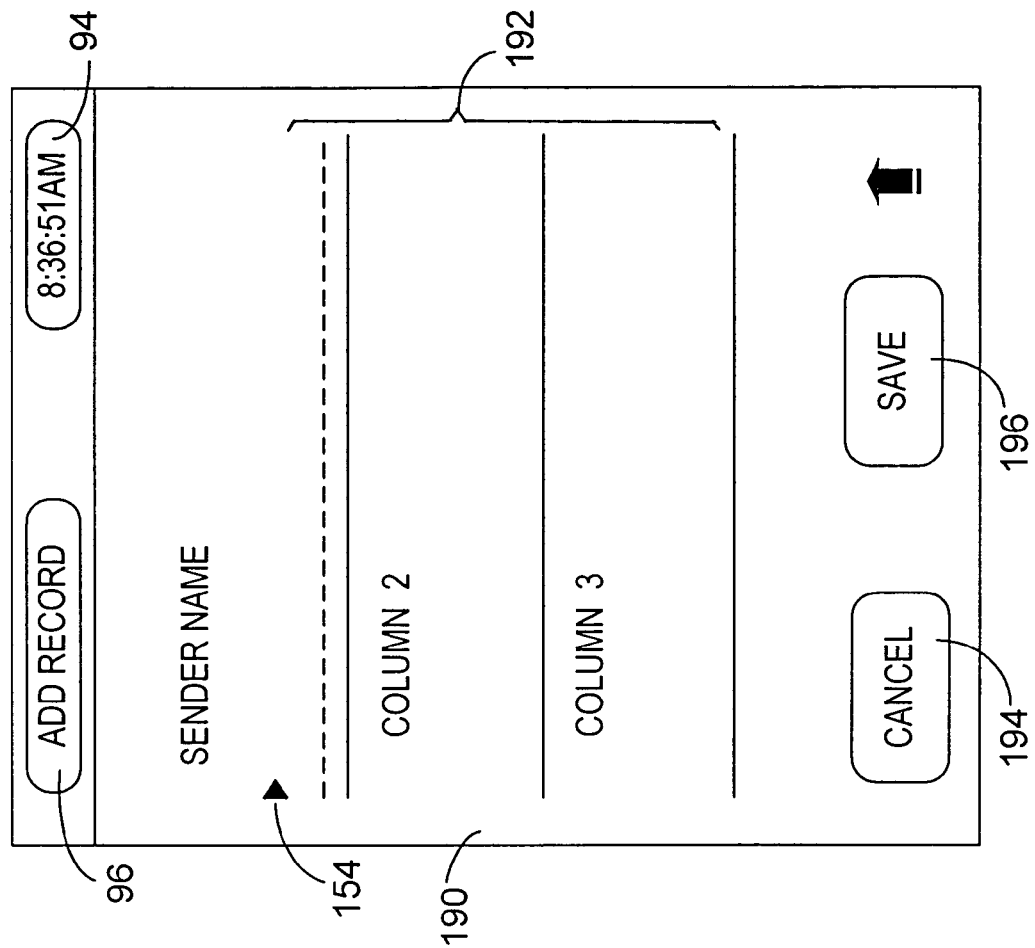
FIG. 9 is a schematic representation of a display screen showing an exemplary Add Record screen which allows a user to add a record under a selected carrier.

In order to add a new name on the popup list, the user can press the Add button 177 to reach an Add Record screen as shown in FIG. 9.

By tapping or pressing the Review button 158 on the Receive Parcel screen 150*a* (FIG. 6A), the user can reach a Review Receipts screen 180, as shown in FIG. 8. The Review Receipts option is used to access a summary of the items that the user has processed (or entered). The amount of information for each transaction depends on the receiving format that the user is using and the amount of information entered. As shown, a review list 182 shows the symbol and the name of a carrier, while the review box 183 lists the details of the receipt information related to the carrier shown in the review list 182. However, the review list is also used to show the employee name, the sender name, etc. The user can enter a value in the Entry field 184 to search for a particular record, such as a tracking number, a carrier name, or an employee name, to be shown in the review list 182. A scroll bar 186 is used to scroll through the record related to the data item shown in the review list 182. As shown, the record is related to a particular carrier.

If the user wants to add a record related to a particular carrier, the user can highlight the carrier on the popup list shown on FIG. 7 and then tap the Add button 177. An Add Record screen 190 is shown in FIG. 9. As shown, there are three entry fields 192 on which the user can input data. The Save button is used to save the entered data to the record for the selected carrier. The Cancel button is used to cancel the entered information and return the previous screen (FIG. 7).

The process for recording information regarding the receipt of items has been described with the description taken in conjunction with FIG. 2 to FIG. 9 above. The process for recording information regarding the internal delivery actively is explained in FIGS. 10 to 14.

If the Delivery program is selected from the display screen 34 shown in FIG. 1, a Delivery screen as shown in FIG. 10 appears. As shown in FIG. 10, the Delivery screen 200 shows a delivery data collection format in the box 202.

Figures 12, 13:
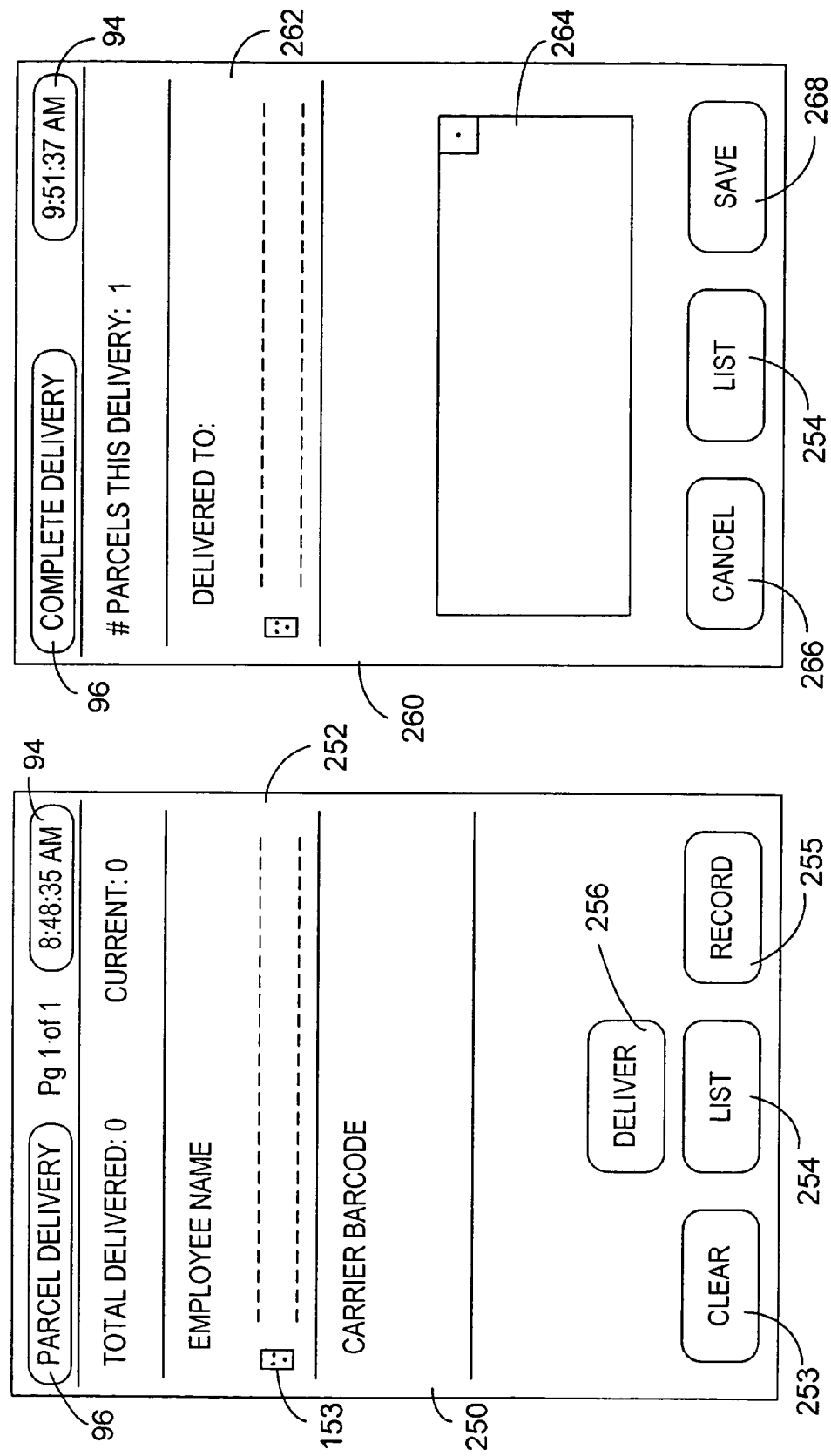
FIG. 12 is a schematic representation of a display screen showing an exemplary Parcel Delivery screen which allows a user to enter information regarding the delivery of an item.
FIG. 13 is a schematic representation of a display screen showing an exemplary Complete Delivery screen which allows a user to enter the name and the signature of the person who actually signs for the delivered item.

If the user wants to use the displayed data collection format 102 to collect delivery data, the user can press the Collect button 204 to reach a delivery data collection screen as shown in FIG. 12.

If the user wants to use another data collection format to collect receiving data, a Pick Format screen for delivery as shown in FIG. 11A can be reached by tapping the box 202.

However, if the user wishes to see a summary of the items delivered, the user can select the Review option 204 to reach a Delivery List screen as shown in FIG. 14.

FIG. 11A shows an exemplary listing of the Delivery data collection formats on the Pick Format screen 210. As shown, there are five different receiving data collection formats, collectively denoted by reference numeral 212, along with the descriptions 214 of the formats. If the user wants to return the Delivery screen 200 (FIG. 10), the Cancel button 222 should be pressed. If the user wants to select any one of the listed formats, the user can highlight the desired format and then press the Select button 226. The Show button 224 is used to reach a Format Contents screen as shown in FIG. 4.

FIG. 11B shows the format contents of different Delivery data collection formats. As shown, each data collection format is a different combination of data entry fields including: the name of the carrier, the name of the intended recipient (employee), the carrier barcode, the name of the sender, and the person who actually signs for the delivered item. The user can select one of the delivery data collection formats for recording the delivery of an item.

The Parcel Delivery screen 250 shown in FIG. 12 lists two data entry fields 252. The data entry fields 252 include the recipient name and the carrier barcode. Data can be entered using the on-screen keyboard (not shown) or the laser scanner 40 of the portable data terminal 30 (FIG. 1). As shown in FIG. 12, a paper icon 153 appears next to the Employee Name field. Thus, a popup list for the intended recipient is available for the user to select the Employee Name. In FIG. 12, the display screen 250 also shows four buttons in the lower portion of the screen: a Clear button 253, a List button 254, a Record button 256, and a Deliver button 256. The Clear button 253 is used to clear information entered to the data entry fields 252. The List button 254 has the same function as the Review button 206 shown in FIG. 10. The Record button 160 is used to save the information entered to data entry fields 252. The Delivered button 256 is used to reach a Complete Delivery screen 260 as shown in FIG. 13.

The Complete Delivery screen 260 is used to record the name and the signature of the person who actual signs for the delivered item. The name is entered through the data entry field 262, while the signature is entered through the data entry field 264. The Cancel button 265 is used to cancel the entered data and return to the Parcel Delivery screen 250, while the Save button 268 is used to save the entered delivery data.

In order to review the information currently recorded in the Delivery program, a Delivery List screen 280 can be reached by tapping the Review button 206 on the Delivery screen 202 (FIG. 10), or the List button 254 on the Parcel Delivery screen 250 (FIG. 12) or the Complete Delivery screen 260 (FIG. 13). This option is used to provide a summary of the delivered items of which information is currently recorded in the Delivery program. The amount of information for each transaction depends on the receiving format the user is using and the amount of information entered. As shown in FIG. 14, a review list 282 shows the symbol and the name of a recipient, while the review box 283 lists the details of the delivery information related to the recipient shown in the review list 282. However, the review list 282 can also be used to shows the carrier name, the sender name, etc. The Remove button 286 is used to remove a record while the Add Parcel button 287 is used to add a record for a delivered item. The Return button 288 is used to return to the Complete Delivery screen 260 as shown in FIG. 13.

FIG. 15 shows a User Login screen 290. This is a security feature for the portable data terminal 30 for preventing an unauthorized person from using the Receiving or the Delivery program. Preferably, when either program is selected, the User Login screen 290 appears. User data is then entered in the data entry field 292. The Login button 296 and the Logout button 284 are used for the specified functions.

Figure 16:
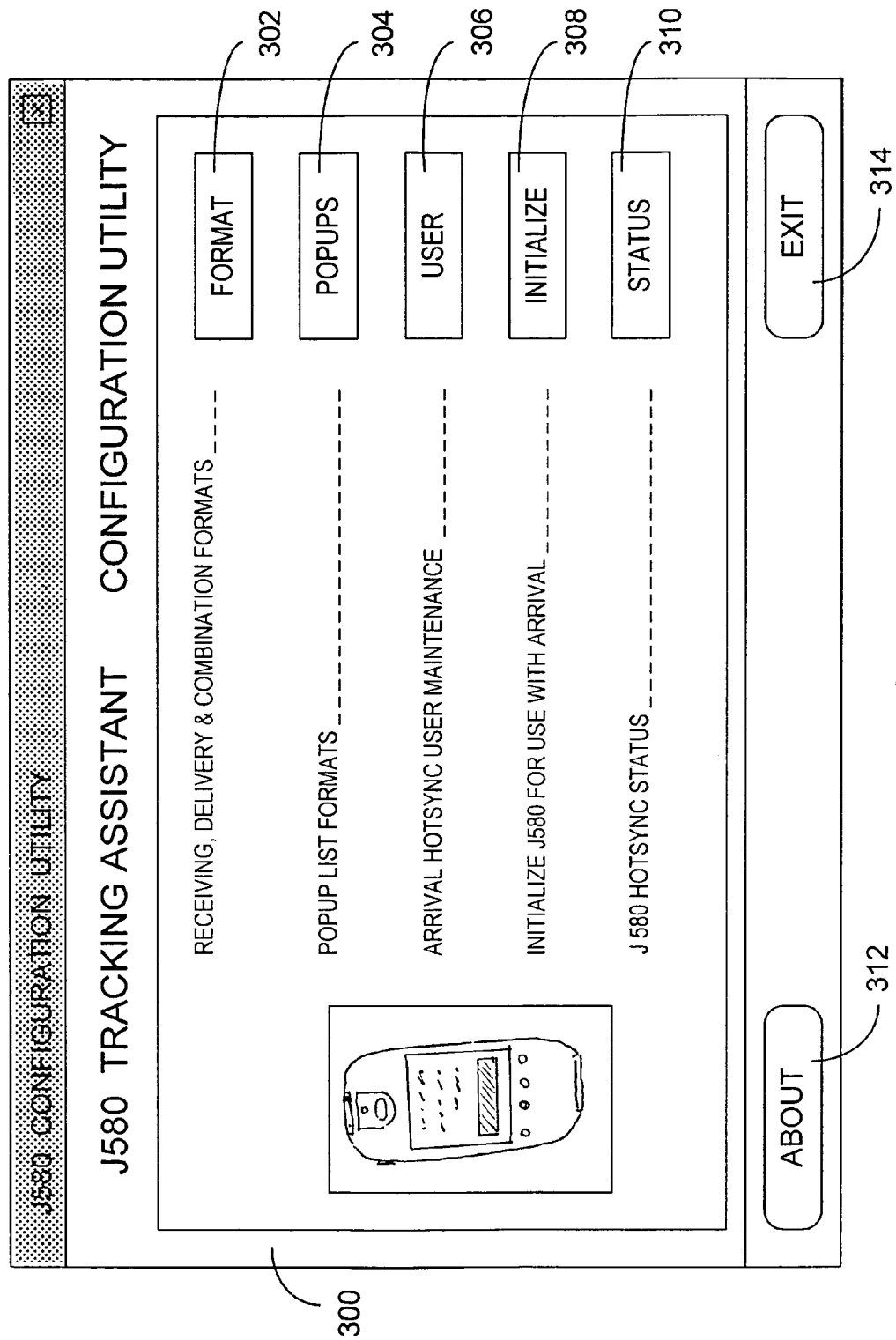
FIG. 16 is a schematic representation of a display window on the base station showing the configuration utility.

If the user wants to create a new data collection format or modify an existing one, the user must use the base station 20. FIG. 16 shows an exemplary default window shown on the base station 20 after starting the creating/modifying program. As shown, the Configuration Utility window 300 has two options that are useful for the understanding of the present invention. The Format option 302 can be selected to create or modify the Receiving, Delivery or Combination data collection formats as shown in FIGS. 3B and 11B. The Popups option 304 can be selected to create or modify a popup list, as shown in FIG. 7. The User option 306, the Initialize option 308 and the Status option 310 are not part of the claimed invention and, therefore, their functions are not elaborated herein.

Figure 20:
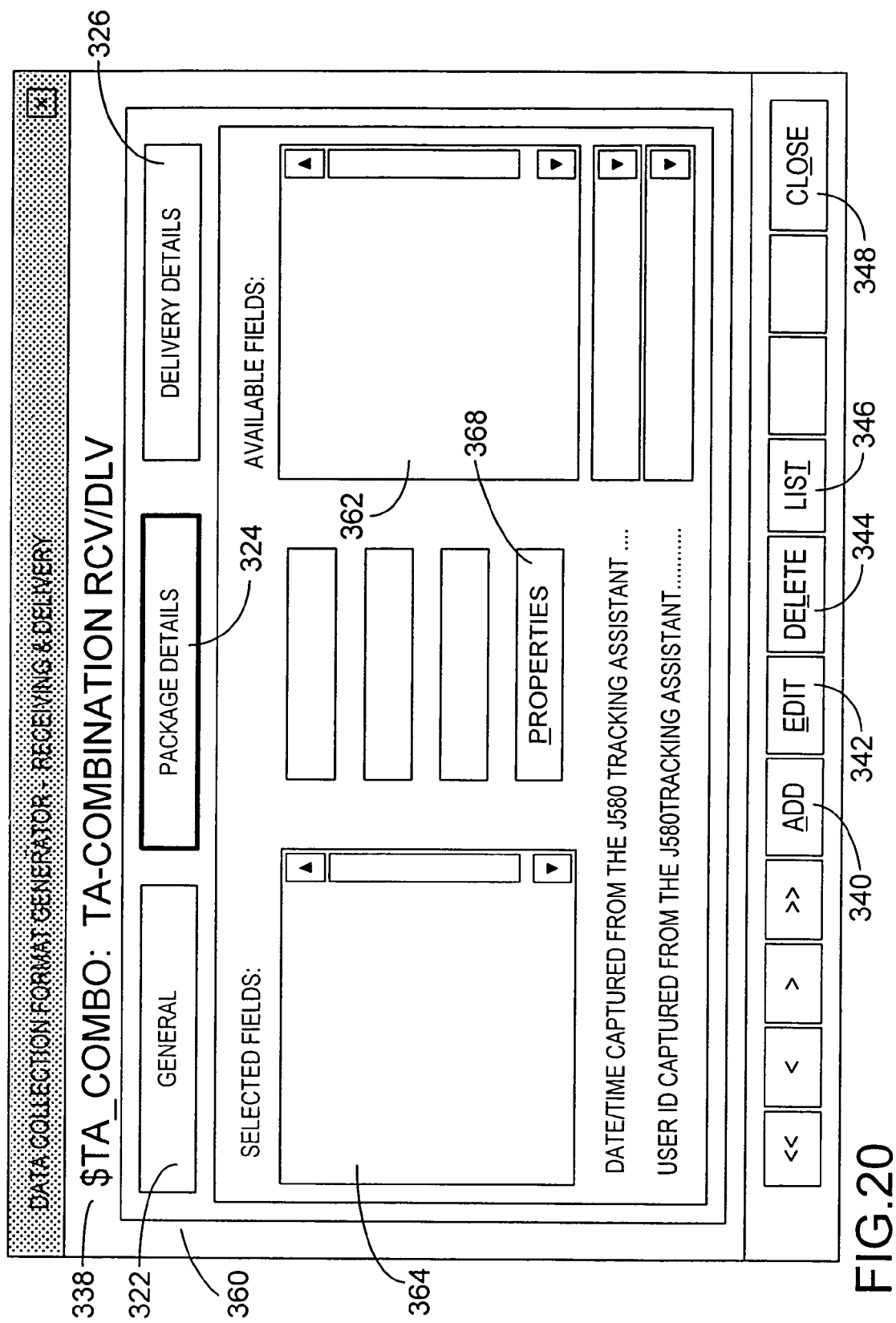
FIG. 20 is a schematic representation of a display window showing an exemplary Entry/Edit window that allows the user to select fields which are to be assigned to the package selection of data collection.
Figure 23:
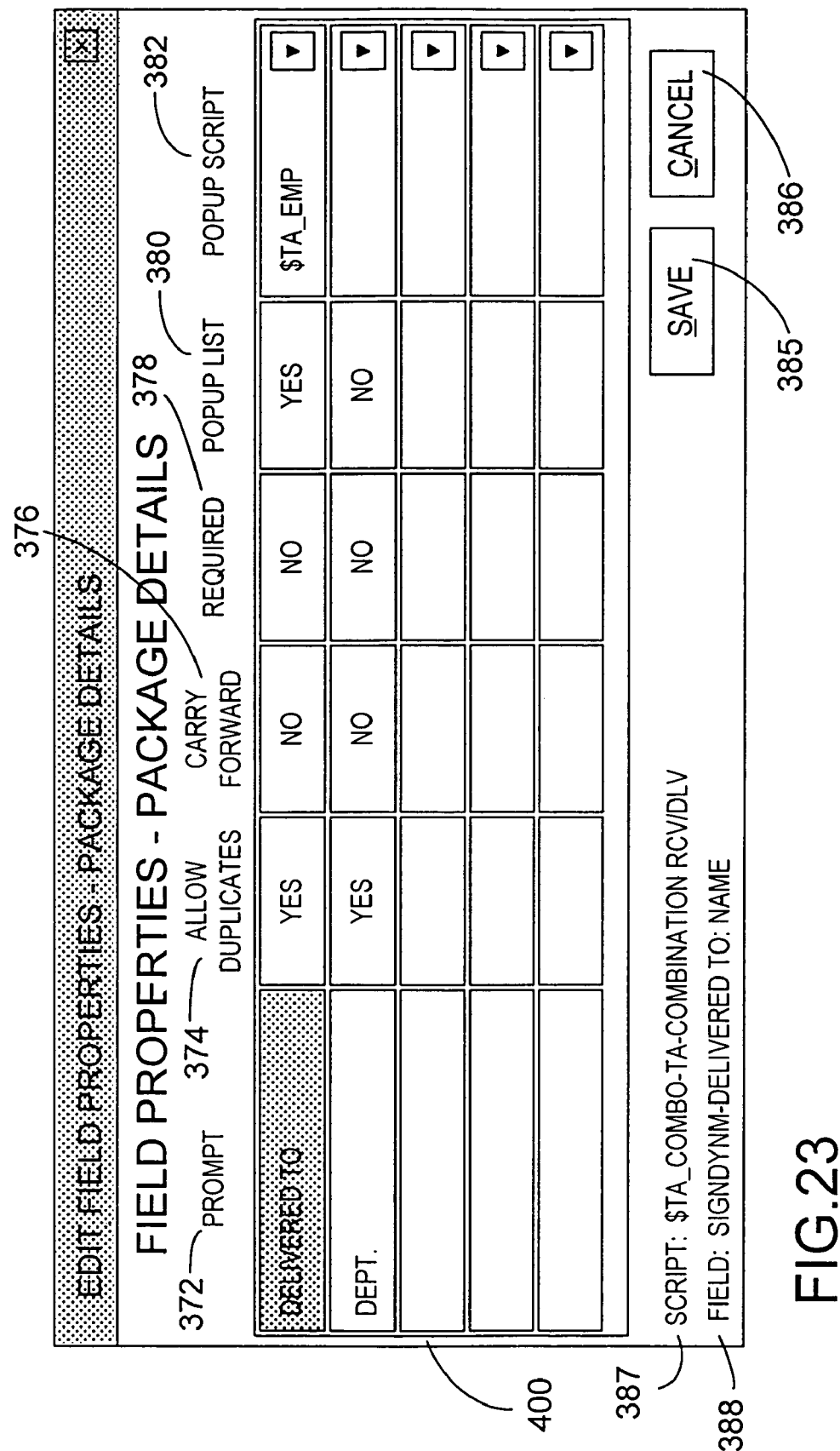
FIG. 23 is a schematic representation of a display window showing an exemplary Properties screen related to the Delivery event activities.
Figure 24:
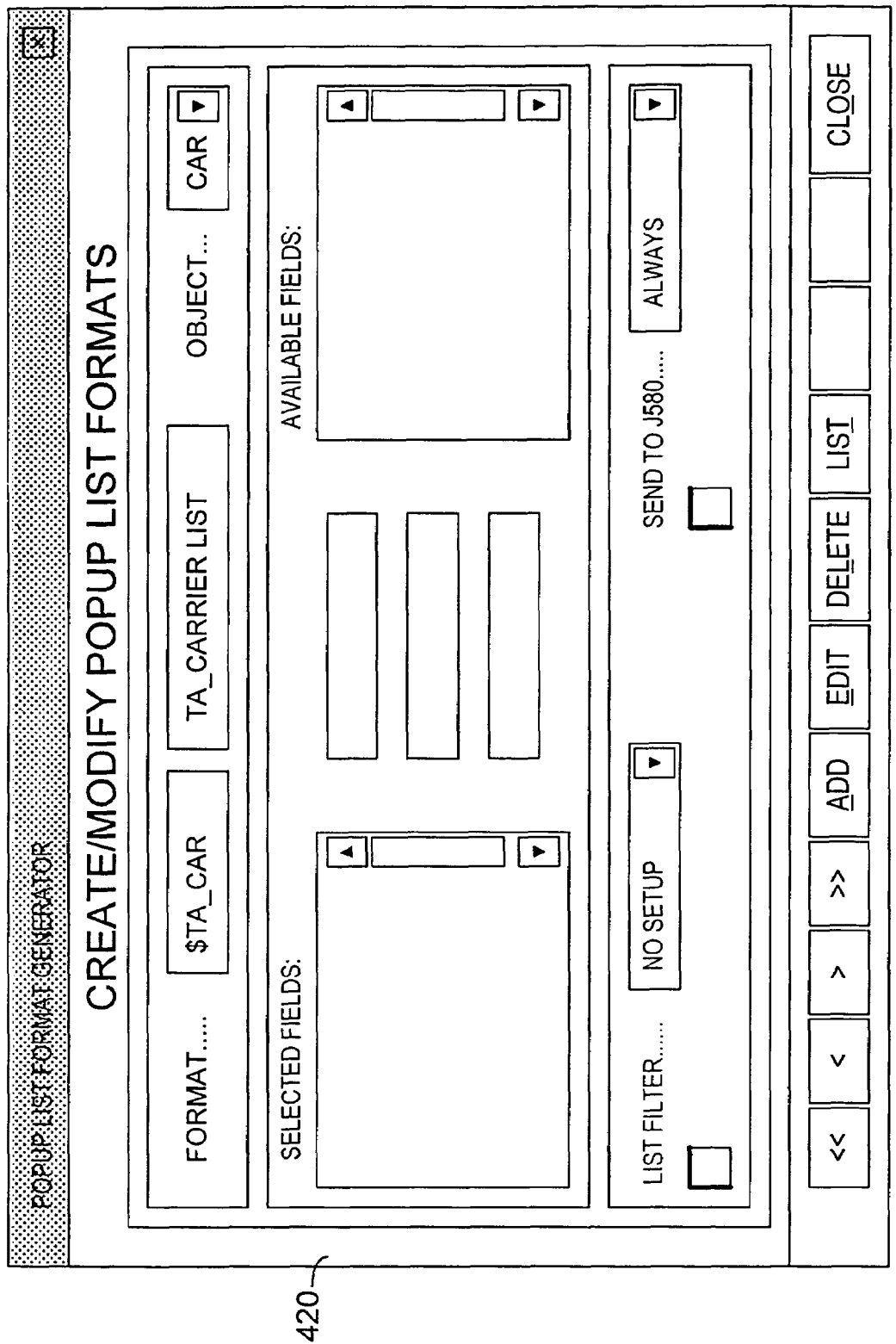
FIG. 24 is a schematic representation of a display window showing an exemplary popup list format generator window which allows the user to create an empty popup list which can be later filled in with entry items in the portable data terminal.

The data collection formats as created and modified in the base station 20 provide configuration information that the portable data terminal 30 uses to control prompts, prompt sequence and field attributes. When the Formats option 302 is selected, a Data Collection Format Generator window 320 appears on the display screen 24 of the base station 20 (FIG. 1). The Data Collection Format Generator window 320 has three tabs. The General Tab 322 is used to create and modify scripts and formats. The Package Details Tab 324 is used to reach the Package Details window 360 as shown in FIG. 20. The Delivery Details Tab 326 is used to reach the Delivery Details window 400 as shown in FIG. 23.

Figure 17:
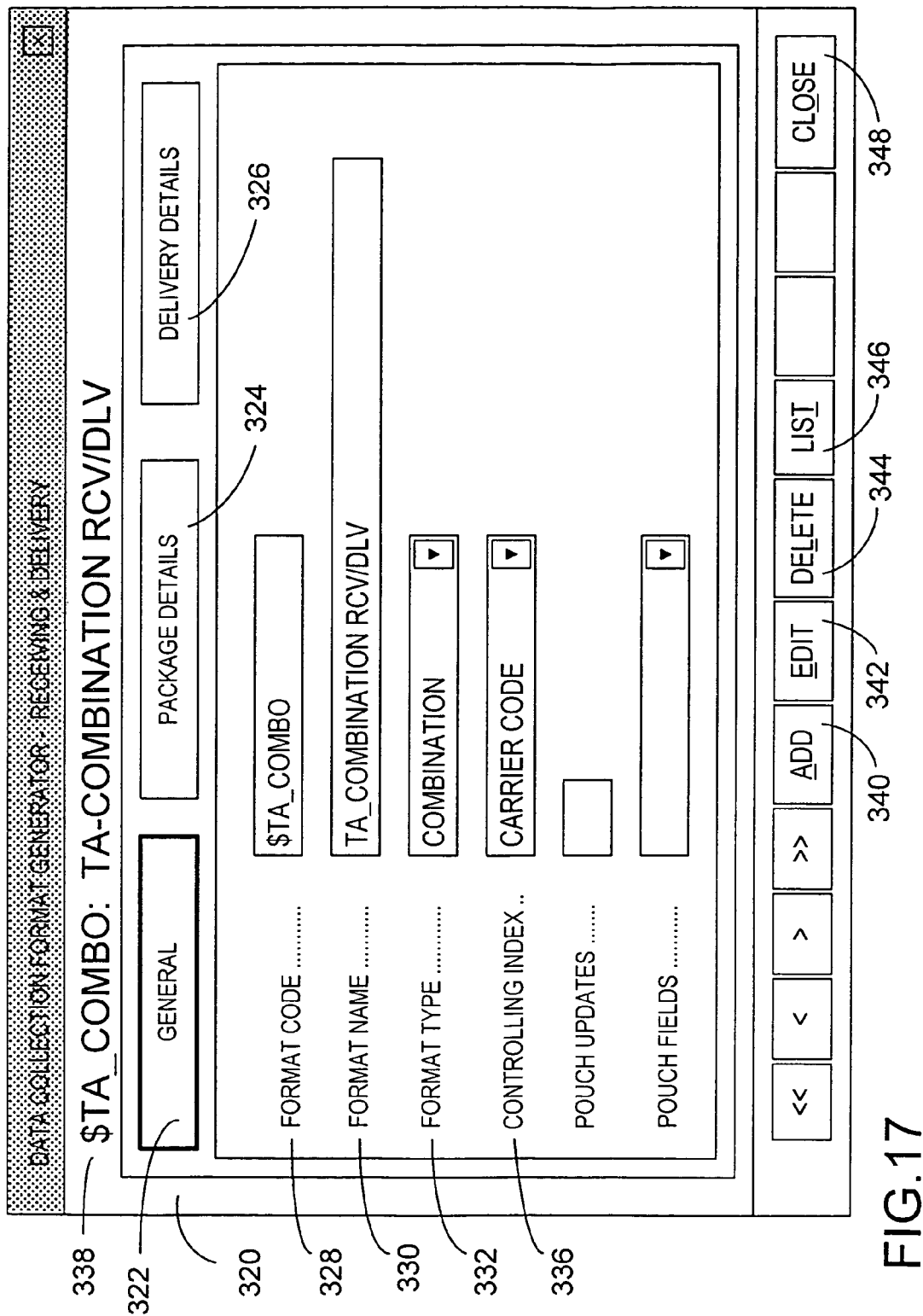
FIG. 17 is a schematic representation of a display window showing an exemplary data collection format generator window which allows the user to edit a data collection format as shown in FIGS. 3A and 11A.

As shown in FIG. 17, the data can be entered through five data fields. The Format Code field 328 is used to identify the data collection format on the Pick Format screen 110 (FIG. 3A) or 210 (FIG. 11A). The Format Name field 330 is used to describe the format shown in the Format Code field 328. The Format Type field 332 is used to identify whether the data collection format is a Receiving type, a Delivery type or a Combination type. The Controlling Index field 336 is used to specify whether the record should be added or edited when transactions are conveyed from the portable data terminal 30 to the data processing unit 12. The Controlling Index field 336 refers to a field in the database within the data processing unit 12 and this field is used as a lookup index key for processing updates from the import file from the data collector. Like the other fields on the window 320, the controlling index field 336 is not part of the claimed invention. The code and the name of the data collection format that appear in the fields 328, 330 also appear in the Title 338.

Figure 18:
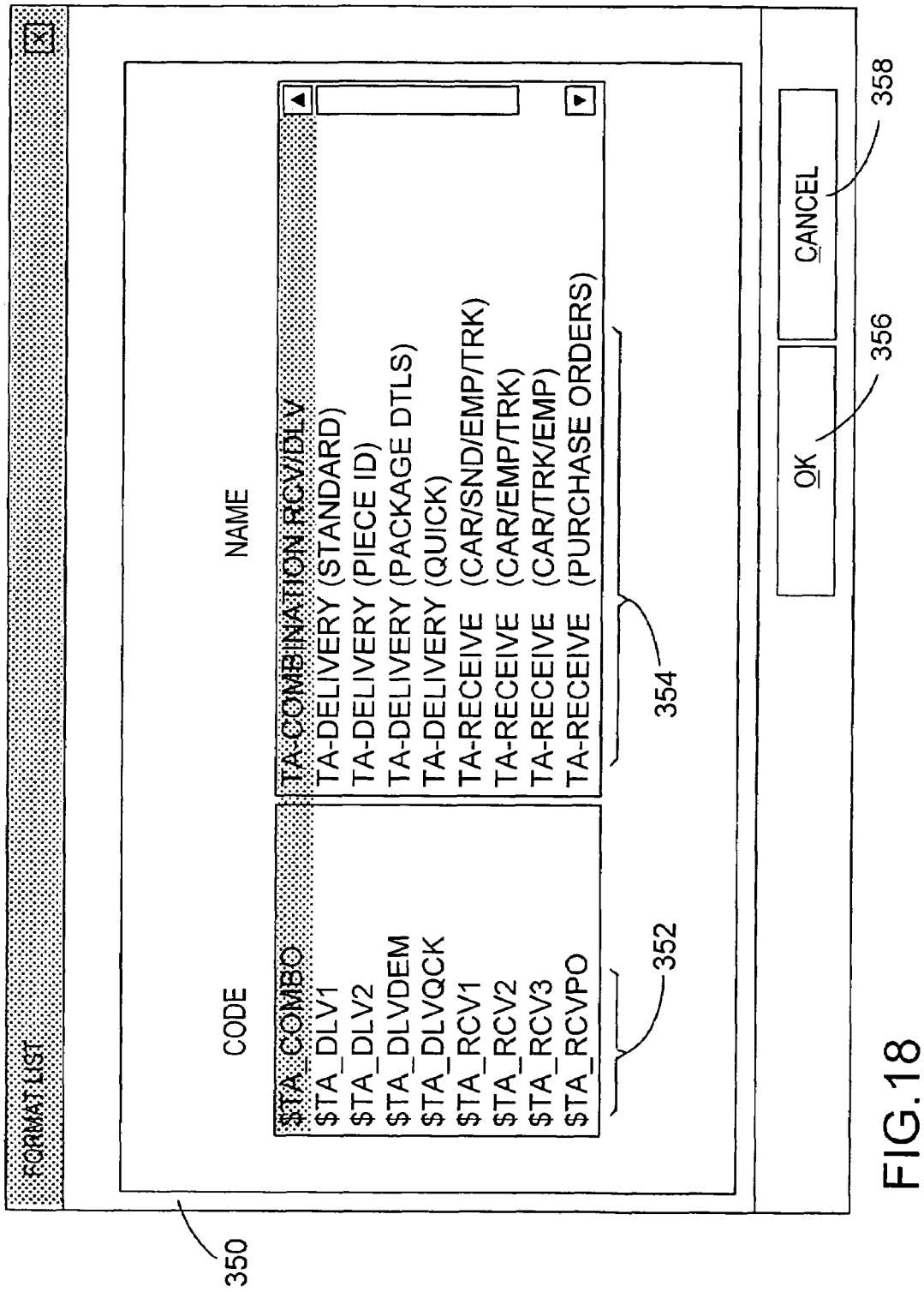
FIG. 18 is a schematic representation of a display window showing an exemplary Format List window which provides a list of data collection formats to allow the user to select and edit a format if so desired.

The General window 320 also has a plurality of selection buttons. The Add button 340 is used to add a new data collection format. The Edit button 342 is used to modify the data collection format shown in the Format Type field 332. The Delete button 344 is used to delete the collection format shown on the window. For example, if the $TA_COMBO format as shown is deleted, this combination collection format will not appear in the Picket Format screens 110 and 210 as shown in FIGS. 3A and 11A. The List button 346 is used to select a data collection format from a Format list as shown in FIG. 18. The Closed button 348 is used to exit the current window.

The Format list window 350 is shown in FIG. 18. As shown, the window provides a list of existing data collection formats, including format codes 352 and format names 354. Any one of the data collection formats can be selected for editing or reviewing. The OK button 356 is used to select a highlighted format, while the Cancel button 358 is used to return to the previous window as shown in FIG. 17.

Figure 19:
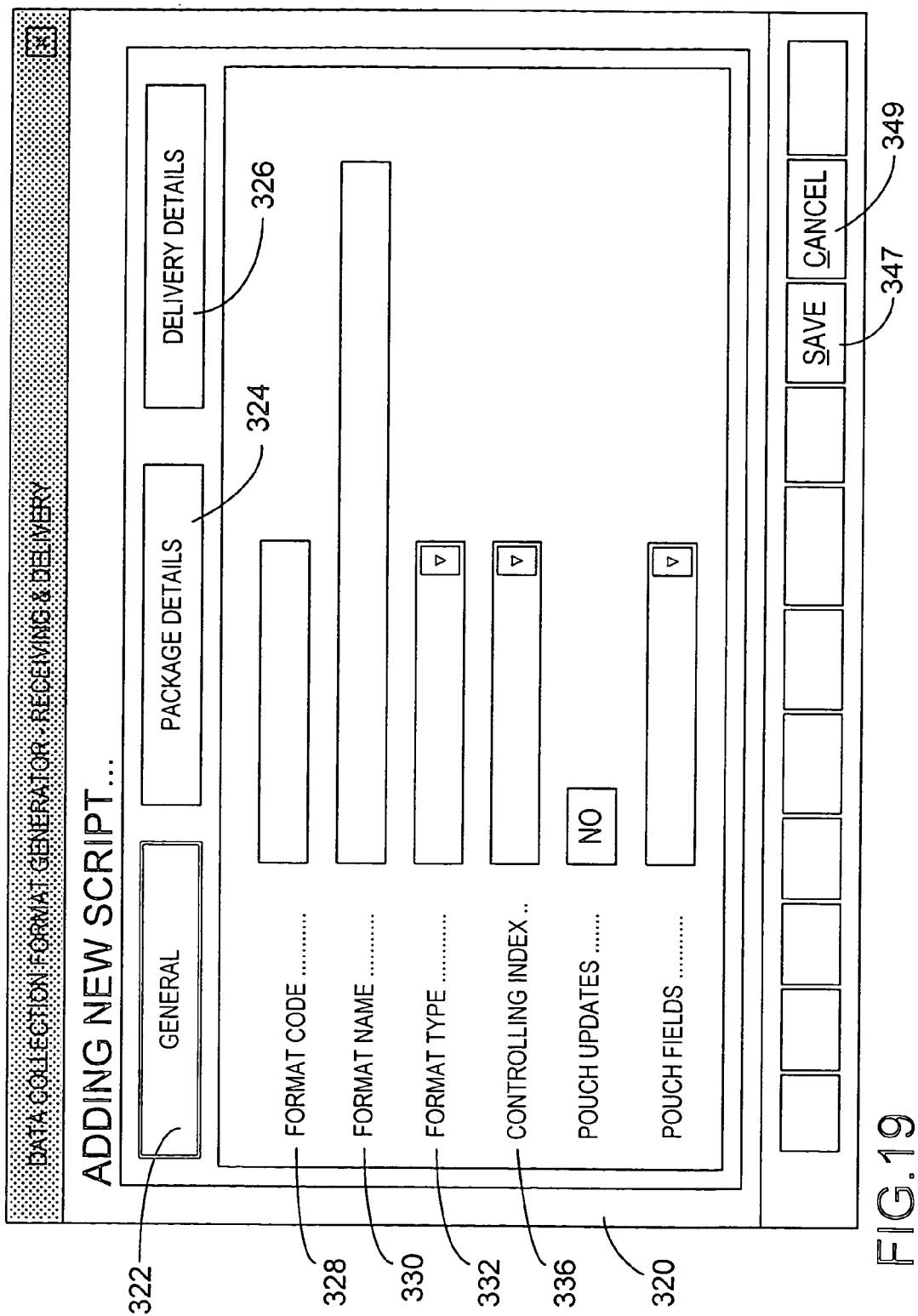
FIG. 19 is a schematic representation of a display window showing an exemplary Add window which allows the user to add a new data collection format.

If the Add button 340 on the window 320 is clicked, a window 320 is displayed with all the blank fields as shown in FIG. 19. The user can create a new collection data format by giving it a code and a name. The Save button 347 is used to save the data entered to the fields 328, 330, 332 and 334. The Cancel button 349 is used to cancel all the entered data and return to the window as shown in FIG. 17.

Package details are the data entry fields that define the actual received item. For example, the tracking number can be used as one of the fields. The data defined in the Package Details tab 324 (see also FIG. 17) is used to determine which fields in the portable data terminal 30 will be updated with data regarding the movement or activity of the received item. The portable data terminal 30 uses the fields defined in the package details tab to describe the items which are being delivered. Up to nine fields, for example, are available in the Package Details tab for a specific format.

The Package Details window 360 is shown in FIG. 20. FIG. 20 shows an Entry/Edit window that allows the user to select fields which are to be assigned to the package section of data collection by the specified format. The window also allows the order of the collection fields to be revised. The available fields are listed on the window 362. The selected fields for the specific format shown at the title 338 are listed on the window 364.

Figure 21:
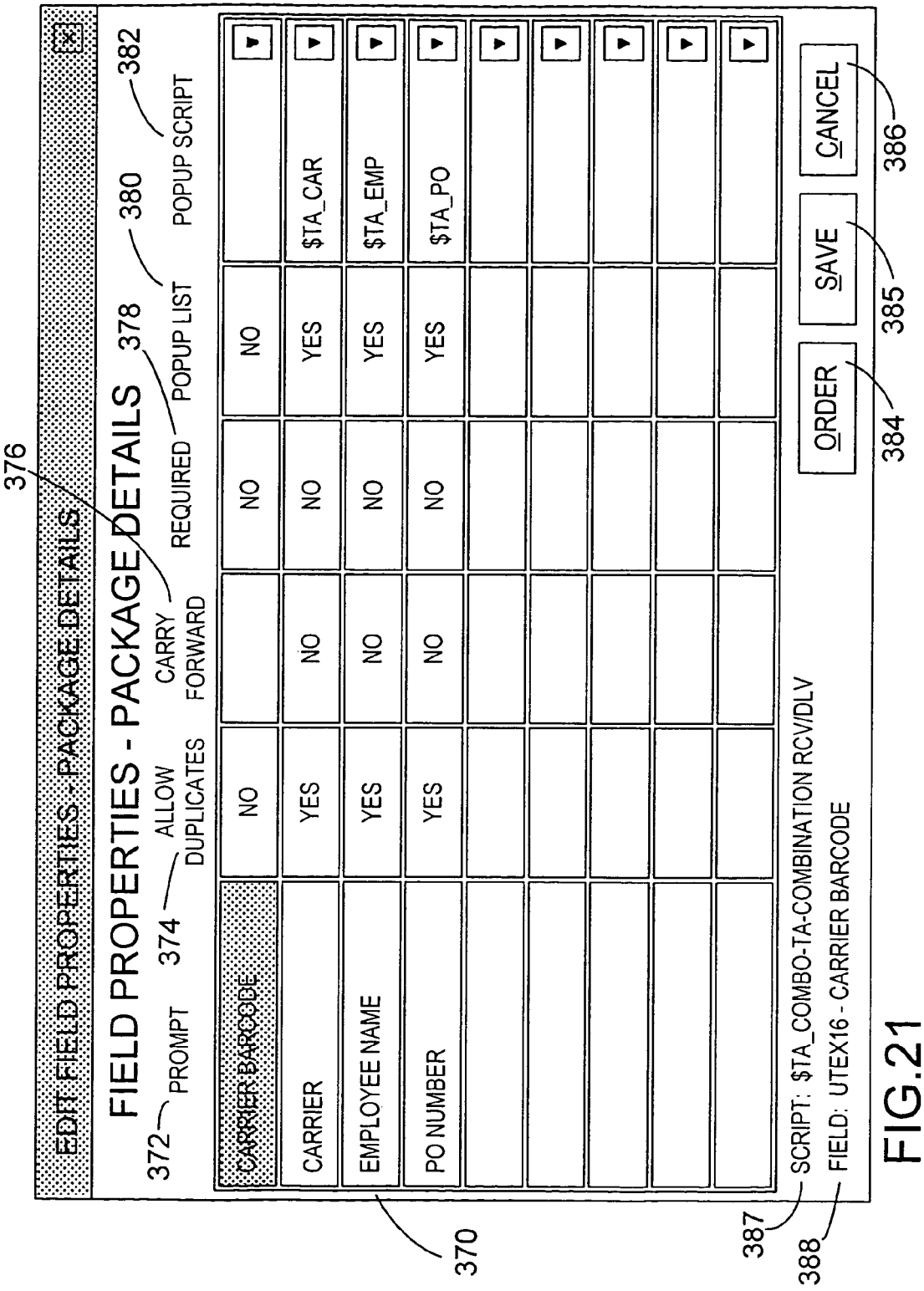
FIG. 21 is a schematic representation of a display window showing an exemplary Properties screen that allows the user to assign "Prompt Names" to the selected fields.

The Properties button 368 on the Package Details window 360 is used to reach the Field Properties window 370 for Package Details, as shown in FIG. 21. Through this window, the user can assign the 'Prompt Names' to the selected fields, and define attributes to each field to be used by the portable data terminal 30 when processing entries for the respective fields. As shown, the fields described in the Prompt column 372 will be displayed for each field of data to be collected, along with other attributes of each field (see FIG. 5). The other attributes are Allow Duplicates 374, Carry Forward 374, Required 378, Popup List 380 and Popup Script 382.

The toggled button 'yes' or 'no' in FIG. 21 is corresponding to check box as shown in FIG. 5. If a 'yes' is selected on the toggled button, the check box is checked. When a 'yes' is selected for the Carry Forward attribute, the value of this field should be carried forwarded, and automatically displayed as the value to save for the next record collected. Similarly, when a 'yes' is selected for the Allow Duplicates attribute, duplicate checking will not be employed for values entered into this field. When a 'yes' is selected for the Required attribute, any entry must be supplied for this field on every record. When a 'yes' is selected for the Popup List attribute, this field displays a lookup table or popup list during data entry and the name of the lookup table or popup list is identified. The Popup Script 382 is the name of the popup list of the corresponding attribute. The displayed field 388 is the name of the field within the data collection system that will be populated within the collected data as shown in FIG. 5.

Figure 22:
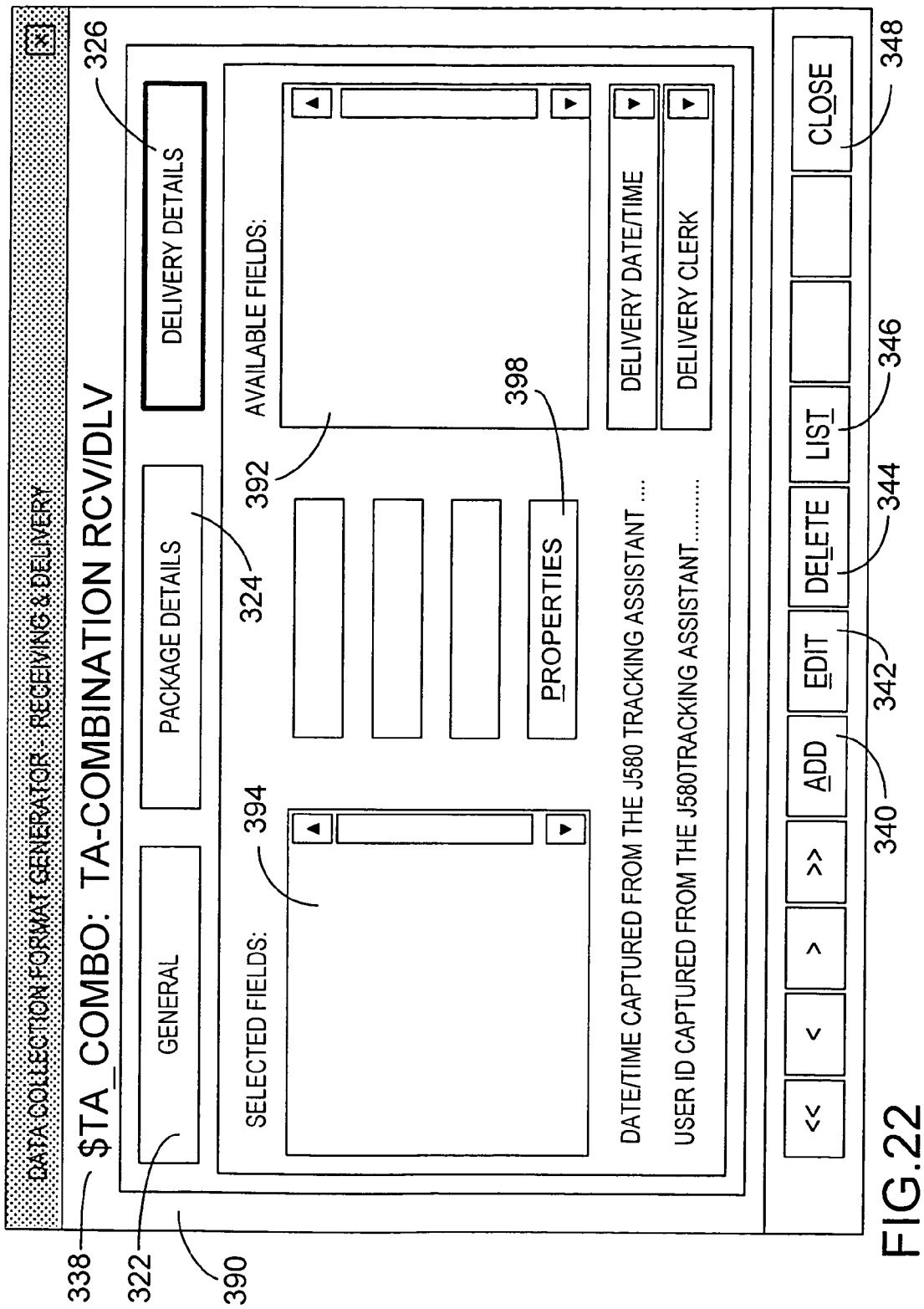
FIG. 22 is a schematic representation of a display window showing an exemplary Entry/Edit window that allows the user to select fields which are to be assigned to the package selection of data collection related to the Delivery event activities.

The Delivery Details window 390 is shown in FIG. 22. The Delivery Details window 390 is similar to the Package Details window 360. However, the fields specified in the Delivery Details Window 390 are related to the 'Delivery' event activities associated with the final disposition of the receipt item. The available fields are listed on the window 392. The selected fields for the specific format shown at the title 338 are listed on the window 394.

The Properties button 398 on the Delivery Details window 390 is used to reach the Field Properties window 400 for Delivery Details, as shown in FIG. 23. The contents in this window is similar to the contents in the window shown in FIG. 21. However, the contents in this window are related to the 'Delivery' event activities associated with the final disposition of the receipt item.

A Popup List Format General window 420 can be accessed using the Popups button 304 as shown in FIG. 16. It should be noted that this window is used to create an empty list so that the user can fill in the items on the list using the portable data terminal 30. The modification of the popup list itself is described in conjunction with FIG. 7.

Thus, what has been described is a portable data terminal which can be used to record data for the receipt of items and the status information related to the internal delivery or other any final disposition of the received items. The data collection formats are used for data collection and can be created and/or modified by the user according to the user's needs. The creation and/or modification of the data collection formats are carried out in a base station. The base station is capable of communicating with the portable data terminal in order to modify the data collection formats. Preferably, the portable data terminal is capable of communicating with a data processing unit in order to send the data recorded in the portable data terminal to the database in the data processing unit.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A system for tracking receipt and internal movement resulting in a delivery or other final disposition status of items such as packages within an organization, wherein each item is sent by a sender and received from a carrier to be delivered to a recipient, said system comprising:
   a) a portable data terminal programmed to:
      (i) record information regarding the receipt of the item, and
      (ii) record information regarding the internal movement of the item wherein the receipt information and the internal movement information are recorded with a data collection format;
   b) a base station for communicating with the portable data terminal for uploading electronic files for modifying the data collection format; and
   c) means for allowing a user to create one or more data collection formats at the base station, and to transmit the one or more data collection formats to the portable data terminal, wherein the portable data terminal can collect data in the one or more data collection formats transmitted by the base station.

2. The system of claim 1, further comprising a data processing unit capable of communicating with the portable data terminal, wherein the data processing unit is programmed to
   (a) maintain a database of records relating to the received items, each of said records identifying an internal delivery address and internal movement status for a corresponding one of said received items;
   (b) maintain a database of recipient names; and
   (c) generate a manifest of selected ones of said received items.

3. The system of claim 2, wherein the data processing unit is further programmed to maintain a database of sender names, and carrier names related to said received items.

4. The system of claim 2, wherein the data processing unit is further programmed to provide status information related to said received items through searches, displays, lists, reports and other query and reporting elements.

5. The system of claim 1, wherein the portable data terminal is further programmed to associate the receipt of items with the recipients, the senders and the carriers.

6. The system of claim 1, wherein the portable data terminal comprises:
   (a) a display device to display information regarding the receipt and the internal movement of items;
   (b) an inputting device to input information regarding the receipt and the internal movement of items; and
   (c) a communication device to communicate with the base station.

7. The system of claim 6, wherein the received items contain a barcode to identify the items and the inputting device includes a barcode reader to read the barcode.

8. The system of claim 6, wherein the information displayed on the display device includes a popup list having entry items in order for a user to enter into the portable data terminal information regarding the receipt and the internal movement of an item by selecting the entry item from the popup list.

9. The system of claim 6, wherein the display device displays a plurality of entry fields to allow a user to enter into the portable data terminal information regarding the receipt and the internal movement of an item through the entry fields.

10. The system of claim 1, further comprising a communication medium so as to allow the portable data terminal to communicate with the base station via the communication medium.

11. The system of claim 2, further comprising a connection cradle so as to allow the portable data terminal to communicate with the data processing unit via the connection cradle.

* * * * *